United States Patent [19]
Pruden et al.

[11] Patent Number: 5,865,599
[45] Date of Patent: Feb. 2, 1999

[54] SYSTEM AND PROCESS FOR DIRECT BLADE ANGLE MEASUREMENT IN PROPULSION SYSTEMS

[75] Inventors: Robert W. Pruden, Enfield; Harry R. Paquin, III, Columbia, both of Conn.; Geoffrey A. Wolfe, Carrboro, N.C.; David V. Arel, Granby, Conn.

[73] Assignee: United Technologies Corporation, Windsor Locks, Conn.

[21] Appl. No.: 814,711

[22] Filed: Mar. 11, 1997

[51] Int. Cl.$^6$ ..................................................... B64C 11/36
[52] U.S. Cl. .................. 416/61; 324/207.22; 324/207.25
[58] Field of Search ................................... 416/1, 31, 61; 324/207.22, 207.25

[56] References Cited

U.S. PATENT DOCUMENTS

| | | |
|---|---|---|
| 2,089,441 | 8/1937 | Smith, Jr. . |
| 2,136,223 | 11/1938 | Thomas . |
| 2,370,167 | 1/1945 | Hoover et al. . |
| 2,485,245 | 10/1949 | Schoenbaum ............................ 416/61 |
| 2,806,402 | 9/1957 | Ferris ....................................... 416/61 |
| 3,159,221 | 12/1964 | Gaubis et al. . |
| 3,163,233 | 12/1964 | Lambeck . |
| 3,490,537 | 1/1970 | Quenneville . |
| 3,573,520 | 4/1971 | Dorshimer . |
| 3,876,334 | 4/1975 | Andrews . |
| 3,893,789 | 7/1975 | Andrews . |
| 3,985,884 | 10/1976 | Andrews . |
| 4,523,891 | 6/1985 | Schwartz et al. . |
| 4,922,757 | 5/1990 | Rozelle et al. . |
| 5,211,539 | 5/1993 | McCarty ................................... 416/61 |
| 5,431,539 | 7/1995 | Carvalho . |

FOREIGN PATENT DOCUMENTS

| 576046 | 3/1946 | United Kingdom ..................... 416/61 |
|---|---|---|

*Primary Examiner*—Christopher Verdier

[57] ABSTRACT

A blade angle feedback system for use with a propulsion system having a plurality of angularly adjustable blades, wherein each of the blades has an axis of rotation and is rotatable about the axis of rotation through a plurality of blade angles. The system includes a mechanism for indicating blade angle position of each of the sensed blades. The mechanism for indicating is movable through the plurality of blade angles with the blades, wherein the mechanism for indicating has a plurality of identities depending on and indicative of the blade angle. Mechanisms for designating a plurality of reference positions on the blades of the propulsion system and relative the mechanism for indicating are also provided. The system further includes a mechanism for sensing the passing and identity of the mechanism for indicating and the passing of the mechanism for designating, wherein the propulsion system, the mechanism for indicating, the mechanism for designating, and the mechanism for sensing have geometric relationship defined by geometric parameters. A device for determining time between the passing of the mechanism for indicating and the mechanism for designating and for determining the blade angle from the time, identity, and a plurality of the geometric parameters is also included. A method for determining blade angle is also provided.

24 Claims, 5 Drawing Sheets

SYSTEM AND PROCESS FOR DIRECT BLADE ANGLE MEASUREMENT IN PROPULSION SYSTEMS

TECHNICAL FIELD

This invention is directed to propulsion systems, and more particularly, to adjustable pitch propulsion systems and a system for directly determining propulsion blade angle measurements for use in adjusting blade angles for different flight conditions.

BACKGROUND ART

The determination of the blade angle of propulsion system blades is critical for controlling today's propeller and other multi-bladed fan propulsion systems used in aircraft and other vehicles. In typical systems known in the art, blade angle measurements are taken at some remote location instead of directly from the actual blades. Typically, this remote position is found in the mechanism used for adjusting blade angle. Moreover, due to aggregate tolerances in mechanical systems, disconnections, and malfunctions within such mechanical systems, such a remote measurement of blade angle can, in many cases, be incorrect. With an incorrect reading on blade angle, further adjustment of blade angle based on these readings either manually or by a control system, could cause the propulsion system to enter an unwanted mode, such as feather or flat pitch, when such a mode is not conducive to safe operation given the particular flight conditions. Accordingly, the only sure manner to avoid originating blade angle adjustments from an incorrect base reading, is to directly measure the angle of the propulsion system blades. However, a reliable application of such a system, prior to this invention, has yet to be discovered.

The prior art includes a plurality of blade angle systems, all of which suffer from at least one of the defects discussed above.

For example, U.S. Pat. No. 2,370,167 to Hoover et al. discloses an indicator for variable pitch propellers. The mechanism includes a drive shaft, a part connected to the shaft for rotation therewith, and a part normally rotating with the shaft capable of rotation at a speed different from that of the shaft. Means responsive to differential rotation of the two parts is also included for adjusting the pitch of a blade carried by the shaft. Also, means for causing differential rotation of the parts and means for indicating pitch of the blade are also included. The means for indicating the pitch of the blade comprises means surrounding the shaft for setting up a magnetic field. The mechanism further includes means carried by the shaft and rotatable therewith in the magnetic field for producing an alternating current of a frequency proportional to the speed of rotation of the shaft. Means carried by the second named part and rotatable therewith in the magnetic field produces an alternating current of an alternating frequency, proportional to the speed of rotation of the second named part. Finally, means for producing an indication of the amount of any variation between the frequencies of the two alternating currents is provided. Accordingly, in this mechanism, the blade angle is determined through measurement of discrete parts and is not determined directly from measurements taken from the blade potentially leading to false readings.

U.S. Pat. No. 5,211,539 to McCarty discloses an apparatus for indicating the pitch of turbo fan blades. The apparatus indicates changes in blade pitch of variable pitch blades by detecting relative displacements of first and second members of a blade pitch actuator. The members are selectively displaced to change the pitch of the blades. The apparatus includes sensors which provide output signals to a microprocessor, and which determines displacement of each member with respect to a frame of reference. The microprocessor takes the difference between a displacement of the two members to determine the relative displacement, which is indicative of a change in blade pitch. As indicated above, an inherent problem with such a design is that the pitch determination is dependent upon positions of members comprising the blade pitch actuator and not the actual blade. Accordingly, if a malfunction occurs where the blade is somehow partially or fully disconnected from the actuator, readings from the pitch indicator disclosed herein will provide incorrect information as to the actual pitch of the blades. Accordingly, corrective measures or other adjustments could place the blades into a highly undesirable pitch angle.

U.S. Pat. No. 2,485,245 to Schonembaum discloses a control system for use in controlling the pitch angles of propeller blades. The pitch indicating system, in combination with an aircraft housing, a propeller shaft extending therethrough, a hub mounted on a shaft and variable pitch propeller blades journaled to the hub, includes control members rotatable with the propeller system and moveable relative to each other in correspondence with the pitch angle of the propeller blades. Means energized by one of the control members for part of each revolution of the propeller is provided along with means energized by another of the control members for the remaining part of each revolution of the propeller. Means proportionally responsive to the difference in average energization of the first named means and the second named means is also used. Specific attention is directed to the FIGS. 4 and 5 embodiments, wherein bars 44 are used with propeller blades for sensing by magnet 42. The bar 44 and a structure 45 are the control members which move relative to each other when the pitch of the propeller blades is changed. The bar is shaped such that for any pitch position of the propeller blade, there is substantially no change in the length of the air gap between the surface of the bar and the end of the magnetic pole pieces, when the bar is in an armature forming position. Based on the dual sensing of the bar 44 and of structure 45, the pitch angle can be determined. Since the use of only one bar 44 is shown and taught, the length of bar 44 is problematic for current propeller designs, substantially enhancing the possibility of damaging the bar and also requiring large openings in the propeller bulkhead for sensing by sensors. Accordingly, since such a design is highly subject to damage, the usefulness of the same and current propeller systems is highly suspect.

There exists a need, therefore, for an improved direct blade angle measurement system wherein blade angle is measured directly from propulsion system blades, which system does not require components which are prohibitively long as with current propeller designs, thereby decreasing the likelihood of system component damage.

DISCLOSURE OF INVENTION

The primary object of this invention is to provide an improved direct blade angle measurement system for use with blades of current propulsion systems.

Another object of this invention is to provide a direct blade angle measurement system which includes the use of a plurality of arms connected to one or more blades, depending on the requirements of the control system, which arms are sensed by a sensor, and a plurality of reference poles also sensed by the sensor, wherein a control system is provided for determining blade angle via the sensed information.

And still another object of this invention is to provide a direct blade angle measurement system, which allows for direct blade angle measurement via components extending directly from each sensed propulsion system blade, wherein each component is sufficiently sized so as to avoid system damage.

The objects and advantages of the present invention are achieved by the blade angle feedback system disclosed for use with a propulsion system having a plurality of angularly adjustable blades, wherein each of the blades has an axis of rotation and is rotatable about the axis of rotation through a plurality of blade angles. The system includes a mechanism for indicating blade angle position of each of the sensed blades. The mechanism for indicating is, movable through the plurality of blade angles with the blades, wherein the mechanism for indicating has a plurality of identities depending on and indicative of the blade angle. Mechanisms for designating a plurality of reference positions on the blades of the propulsion system and relative the mechanism for indicating are also provided. The system further includes a mechanism for sensing the passing and identity of the mechanism for indicating and the passing of the mechanism for designating, wherein the propulsion system, the mechanism for indicating, the mechanism for designating, and the mechanism for sensing have geometric relationship defined by geometric parameters. A device for determining time between the passing of the mechanism for indicating and the mechanism for designating and for determining the blade angle from the time, identity, and a plurality of the geometric parameters is also included.

The objects and advantages are further achieved by the method for determining blade angle of a plurality of angularly adjustable blades of a propulsion system of the present invention, wherein each of the blades is rotatable along an axis of rotation through a plurality of blade angles. The method includes the steps of directly indicating blade position of each of the blades via an indicator movable through the plurality blade angles with the blades, wherein the indicator has a plurality of potential identities; defining a plurality of constant rotary reference positions on the propulsion system; sensing the passing of the indicator and the reference positions from a location fixed relative the indicator and reference positions; establishing the identity of the indicator, wherein the identities are indicative of blade angle; measuring time between the passing of the indicator and the reference positions, wherein the propulsion system, the indicator, the reference positions and the location have a geometric relationship defined by geometric parameters; and determining blade angle from the identities, the time and a plurality of the geometric parameters.

BEST MODE FOR CARRYING OUT THE INVENTION

Figure 1:
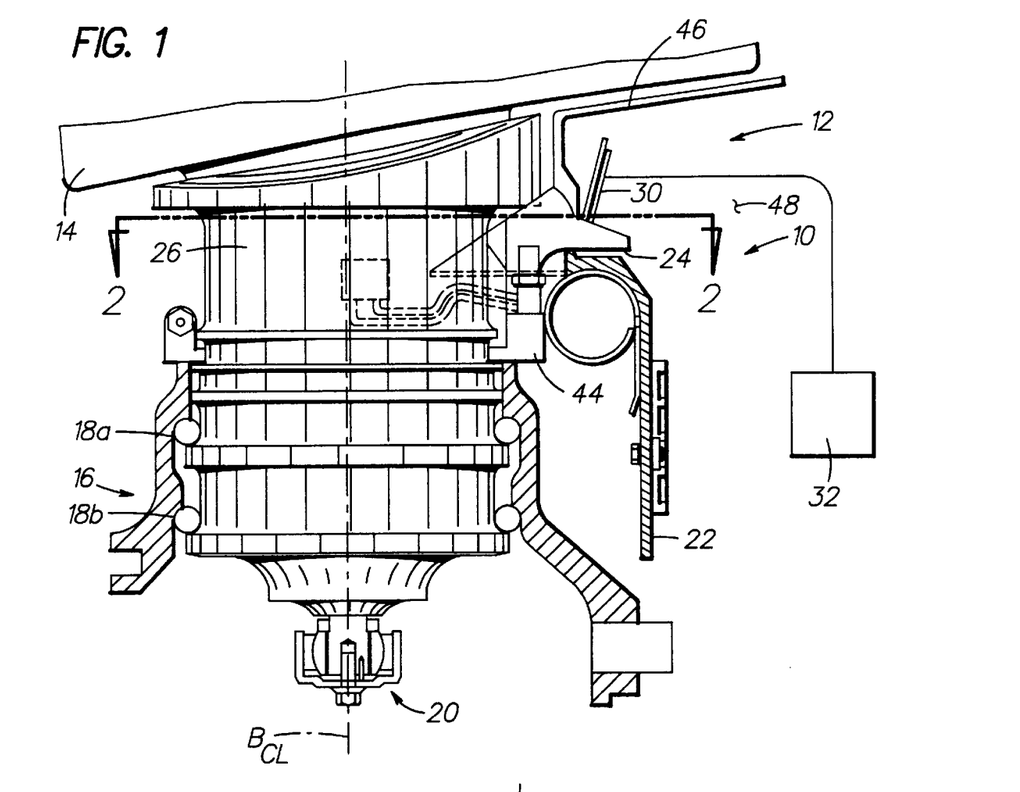
FIG. 1 is an overhead, partial cross-sectional and partial view of the direct blade angle measurement system of the present invention installed on a propeller blade and bulkhead of a propeller system.

Referring now to the drawings in detail, there is shown in FIG. 1 an overhead and partial cross-sectional view of a blade of a propulsion system, particularly a propeller blade, having installed thereon the direct blade angle measurement system of the present invention, which system is designated generally as 10. System 10 can be modified for use with any number of blades associated with different types of propulsion systems. For the sake of describing the present invention, system 10 as used with the aircraft propeller blade system and as shown in FIG. 1 will now be described, it being understood that the direct blade angle measurement system 10 of the present invention is not limited to such use. That is, it is applicable to other variable pitch type propulsion systems such as, and most particularly, variable pitch turbofans for jet engines. The following description, therefore, applies equally to such use, with the replacement of the propeller blade with a variable pitch blade of a turbofan jet engine.

Propeller system 12 includes a propeller blade 14 which is connected with a hub 16 by known means. For example, blade 14 is connected to hub 16 by way of two bearing races 18a and 18b and is thereby rotatable in hub 16 on axis $B_{CL}$ so that the pitch angle of the blade can be changed for achieving such propeller modes as feather, full reverse and forward thrust. System 12 also includes a pitch change mechanism 20, shown schematically, and such as that shown in U.S. Pat. No. 5,199,850, which is hereby incorporated by reference. Accordingly, as desired, the pitch angle of blade 14 may be changed via pitch change mechanism 20 for achieving the desired propeller mode and may receive feedback from system 10 to adjust blade angle depending on blade angle calculations. Hub 16 is attached to the spinner bulkhead 22 by known means, and hub 16 is further attached to the engine of an aircraft, not shown, also by known means.

Figure 3:
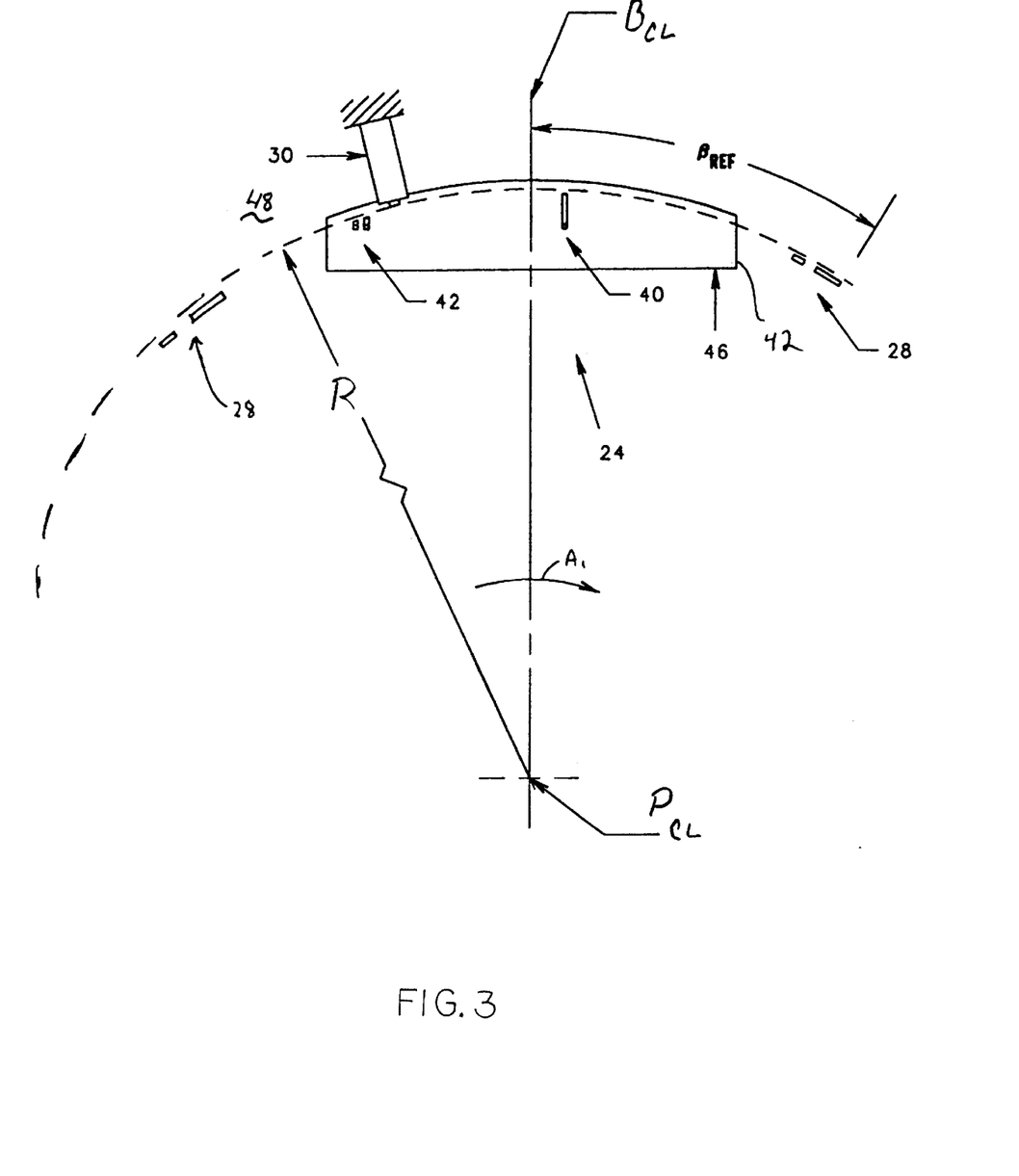
FIG. 3 is an elevational view of the rear of the bulkhead taken along line 3—3 of FIG. 1, wherein R is the radius from the propeller centerline $P_{CL}$, $B_{CL}$ is the propeller blade centerline, and arrow $A_1$ represents the direction of rotation of the propeller blade.

System 10 of the present invention includes an arm structure 24 which is mounted to a base portion 26 of blade 14 for use in indicating blade angle. System 10 generally includes spinner bulkhead 22 being designed to receive arm structure 24, a plurality of reference poles 28 (as shown in FIG. 3) which are equally spaced along the circumference of bulkhead 22 and a sensor 30 adapted to sense both the reference poles and the arms of the arm structure 24 for establishing measurements used by a controller 32, shown schematically, which directly calculates blade angle from the blades. While other sensor types may be used, the sensor 30 is preferably a magnetic pulse pick-up sensor, thus requiring the sensed elements, reference poles 28, and at least the sensed portions 40 and 42 of arm structure 24, discussed in detail below, to be ferrous. At least one sensed portion may be provided.

Preferably, each blade 14 of propulsion system 12 includes an arm structure and a complimentary opening or slot (described below) in spinner bulkhead 22 for receiving the arms for sensing by sensor 30. However, only one system 10 is described in detail, it being understood that the system 10 is preferably and most comprehensively adapted for use with each and every blade of the propulsion system 12, so as to acquire the necessary blade angle feedback.

Figure 2:
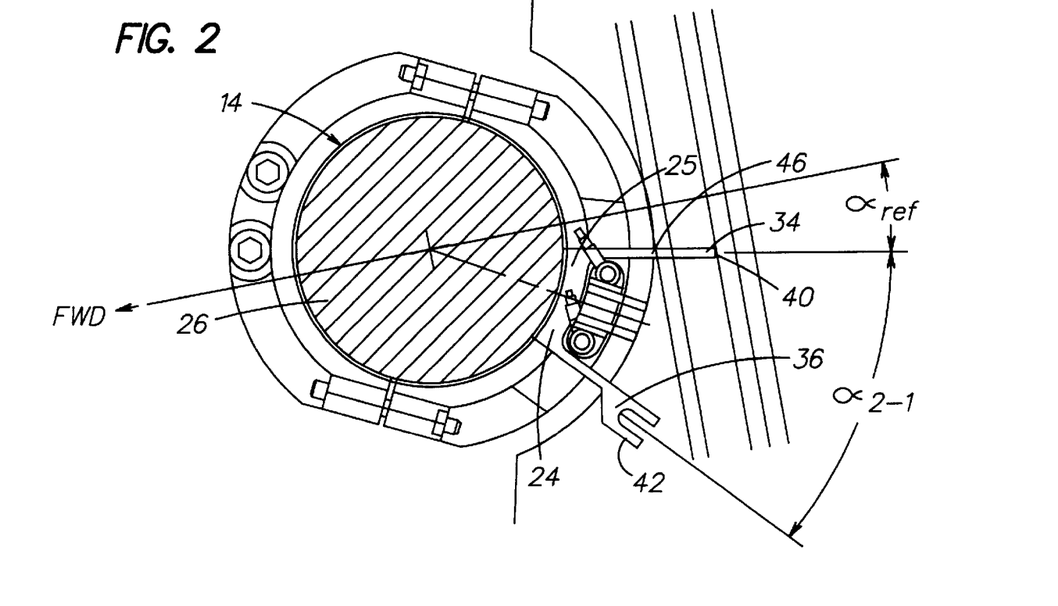
FIG. 2 is a partial cross-sectional view taken along line 2—2 of FIG. 1 showing the double arm system of the present invention with the propeller blade at 0°.

Referring to FIG. 2, arm structure 24 includes a primary single tooth arm 34 and secondary double tooth arm 36, which primary and secondary arms are preferably integrally attached at a base structure 25, which is subsequently attached to base portion 26 of blade 14. However, the arm structure 24 can be formed from a separately formed primary and secondary arms which are also separately attached to base portion 26 of blade 14. Primary arm 34 is substantially a straight continuous member having a single toothed end portion 40 for use with sensor 30 in generating a single pulse or signal. Secondary arm 36 is angularly spaced from primary arm 34 on base structure 25 and includes a double toothed end portion 42, as shown in FIG. 2, for use with sensor 30 for generating a double pulse or signal. The use of a primary and secondary arm for forming arm structure 24 eliminates the need for prohibitively lengthy arm structures, which are highly susceptible to damage, and which would be required for measuring blade angle from the end of the normal operating range to feather without the double arm structure. As the blades 14 change blade angles from feather mode to full reverse mode, the arms are rotated therewith thereby moving within a detectable range, relative sensor 30. Depending on the blade angle mode, the arm structure has a plurality of identities represented by the portions of the arm structure detectable by the sensor, as discussed below with reference to FIGS. 4A–4C.

Arm structure 24 is secured to base portion 26 of blade 14 by way of a bracket 44, as shown in FIG. 1. Bracket 44 preferably includes a plurality of openings, not shown, for receiving fasteners, not shown, for securing the bracket and arm structure 24 to base portion to 26.

Spinner bulkhead 22 is positioned behind propeller system 12 and substantially abuts base portion 26 of blade 15, and as indicated above, is fastened to hub 16. As shown in FIGS. 2 and 3, spinner bulkhead 22 includes a plurality of circumferential slots 46 on a substantially common radius R of spinner bulkhead 22 for receiving the toothed end portions of the primary and secondary arms. That is, with the arm structure 24 secured to base portion 26, as shown in FIG. 1, the primary arm 34 and secondary arm 36 extend through slots 46 into space 48, between the bulkhead and aircraft engine. Referring to FIG. 3, one of slots 46 is preferably provided for each blade 14 which preferably includes one of the arm structures used for measuring blade angle, such that upon adjustment of the blade angle of blade 14 and subsequent movement of arm structure 24 with the blade, primary and secondary arms 34 and 36, respectively, move freely in slots 46. Primary arm 34 and secondary arm 36 along with the two end portions 40 and 42 extend through spinner bulkhead 22 in slots 46 at a substantially common radius R, as shown in FIG. 3, to maintain a constant gap between the arms and sensor 30. This constant gap is also achieved by providing a spherical shape on the top surface of primary and secondary arms 34 and 36.

Reference poles 28 extend from their attachment with hub 16 into slots 46 in spinner bulkhead 22 or attach directly to the spinner bulkhead 22, and are also aligned on common radius R so as to pass within the range of sensors 30. Each reference pole 28 is shaped to provide a multiple pulse target and, for example, has two prongs. The width and/or spacing of reference poles 28 is different from that of primary and secondary arm end portions 40 and 42, in order to be recognizable as the reference poles. Reference poles 28 are equally angularly spaced on radius R at the rear of hub 16, wherein one reference pole is provided for each propeller blade. Accordingly, if a six blade propeller system is used, six reference poles 28 are used wherein each reference pole is spaced 60 degrees from the other on common radius R.

Referring again to FIG. 1 and to FIG. 3, sensor 30 is positioned and secured in space 48 between spinner bulkhead 22 and the aircraft engine, in a nonrotatable manner, for sensing the passing of the single toothed end portion 40 and the double toothed end portion 42, as well as reference poles 28. Sensor 30 is preferably also secured in a nonrotatable fashion to the aircraft chassis at its stationary end structure, preferably at gearbox 50 of the aircraft, such that spinner bulkhead 22, blade 14 and the primary and secondary arms 34 and 36, along with reference poles 28, move relative to sensor 30.

Accordingly, as propeller system 12 is in operation and blades 14 thereof are rotating, one or more movable pulse targets are passed by sensor 30 for use in subsequent computations by controller 32 for determining the blade angle of each blade 14. As the single tooth end portion 40 of primary arm 34 passes sensor 30, a single pulse is generated and as the double tooth end portion 42 of secondary arm 36 passes sensor 30, a double pulse is generated. As reference pole 28 passes sensor 30, a uniquely shaped multiple pulse is generated.

Due to the blade angle of blades 14, in the full reverse mode, only primary arm 34 is detectable by sensor 30 as a result of the movement of secondary arm 36 out of the detectable range of sensor 30. Similarly, when propeller system 12 is in the feather mode, primary arm 34 having the single toothed end portion 40 is moved out of the detectable range of sensor 30 while secondary arm 36, having the double toothed end portion, remains in range and is detectable. At the mid range mode of blades 14 of propeller system 12, both the single toothed end portion of primary arm 34 and the double toothed end portion 42 of secondary arm 36 are within the detectable range of sensor 30. Accordingly, as a consequence of the geometry of the arm structure, the rotational movement of bulkhead 22 and the pitch angle adjustments of blade 14, different pulse blade patterns are detected by sensor 30.

Figure 4A:
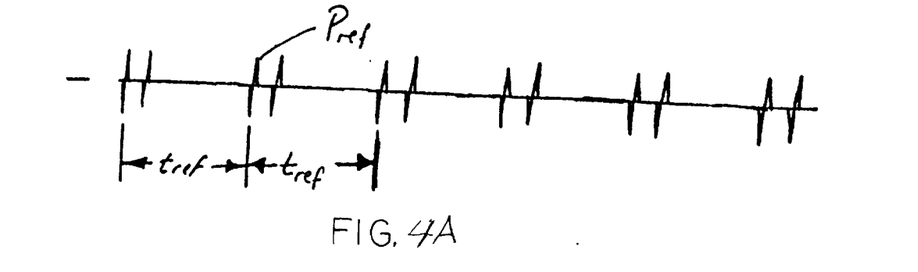
FIG. 4A is a graphs indicating time intervals of arm system pulse occurrences within a constant reference time $t_{ref}$, for use in measuring blade angle, for full reverse mode.
Figure 4B:
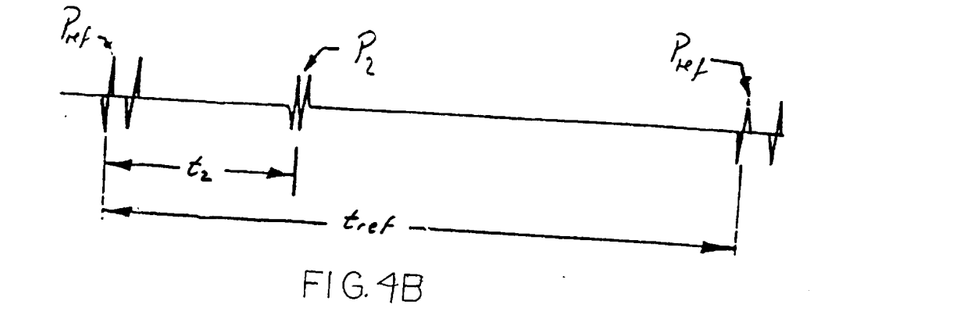
FIG. 4B is a graph indicating time intervals of arm system pulse occurrences within a constant reference time $t_{ref}$, for use in measuring blade angle for feather mode.
Figure 4C:
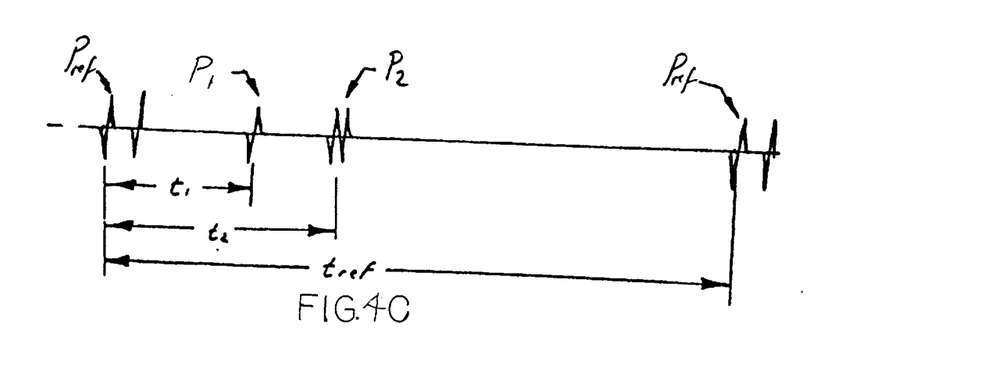
FIG. 4C is a graph indicating time intervals of arm system pulse occurrences within a constant reference time $t_{ref}$, for use in measuring blade angle for mid-range mode.

More particularly, and with reference to the graph of FIG. 4A, in full reverse mode, sensor 30 detects only reference pulses $P_{ref}$ at interval $t_{ref}$, from reference pole 28, and a single pulse $P_1$ at time $t_1$ from primary arm 34 having single toothed end portion 40. With reference to FIG. 4B, in the feather mode, sensor 30 detects only reference pulses $P_{ref}$ at interval $t_{ref}$ from reference pole 28 and a double pulse $P_2$ at time $t_2$ from secondary arm 36 having the double toothed end portion 42. With reference to FIG. 4C, in the mid range mode, sensor 30 detects the reference pulses $P_{ref}$ at interval $t_{ref}$ of reference poles 28, along with both the single pulse $P_1$ at time $t_1$ from primary arm 34 having single end portion 40, and the double pulse $P_2$ at time $t_2$, from secondary arm 36 via double toothed end portion 42.

The times of and between pulses, as indicated by $t_1$, $t_2$ and $t_{ref}$ in FIGS. 4A–4C, are then used by controller 32 to determine the blade angle of blade 14, which computations are discussed below in the operational portion of this description.

In operation, blade 14 along with hub 16 and spinner bulkhead 22 rotate relative to fixed sensor 30. The sensed portion of arm structure 24 including the single toothed end portion 40 of primary arm 34 and the double toothed end portion 42 of secondary arm 36 moves along radius R of spinner bulkhead 22. As the sensing portion of sensor 30 is substantially aligned with the sensed portions 40 and 42 of the arm and reference poles 28, sensor 30 picks up multiple pulses from reference poles 28, single toothed end portion 40, and double toothed end portion 42. The size and location of the moveable pulse pickup targets associated with the primary and secondary arms 34 and 36 are designed such that the single tooth pulse will be generated at all propeller blade angles where blade angle or beta feedback is required for active control of the propeller in beta and speed governing modes. This single pulse will be used for measurement of propeller blade angle in the beta and speed governing range, i.e. full reverse mode to an approximately 50 degree blade angle. The double pulse will be used whenever the propeller blade angle is above the speed governing range, i.e. near the feather mode.

Figure 5:
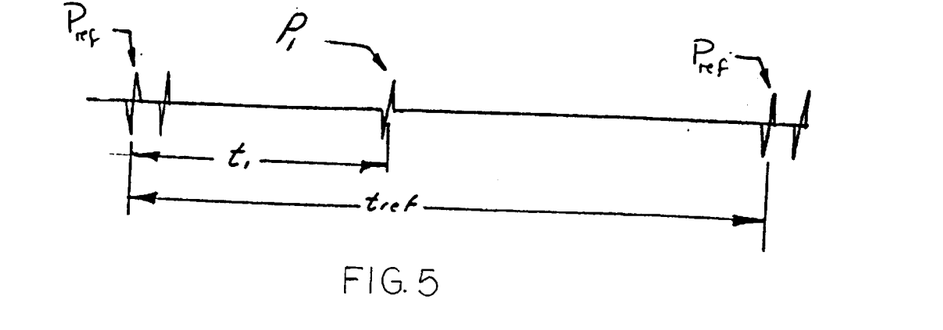
FIG. 5 is a graph indicating the constant occurrence of reference pulses $t_{ref}$, as sensed by a sensor of the arm system and used thereby for measuring the occurrence of arm system pulses, and subsequently for determining blade angle.

The time between pulses is determined via the combination of sensor 30 and calculations via controller 32. The time between successive reference pulses $t_{ref}$ is time associated with 60 degrees of propeller rotation. Accordingly, the pulse train for the six reference poles appear as shown in FIG. 5. The pulses associated with the specific pair of moveable pulse targets originating from arm structure 24 will occur after one of the reference pulses from reference poles 28. The timing and appearance of the moveable target pulses will vary as a function of propeller blade angle mode.

Figure 6A:
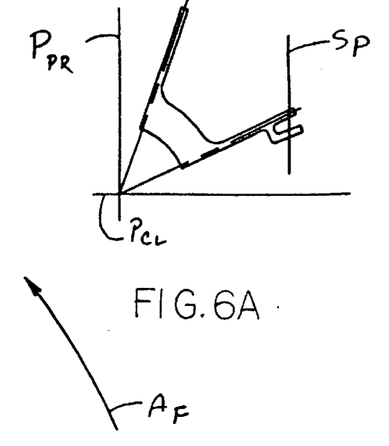
FIGS. 6B and 6A are schematic views of the arm system and its relationship to the propeller plane of rotation $P_{PR}$, the propeller center line $P_{CL}$, and sensor plane $S_P$, in full reverse and feather, respectively.
Figure 6B:
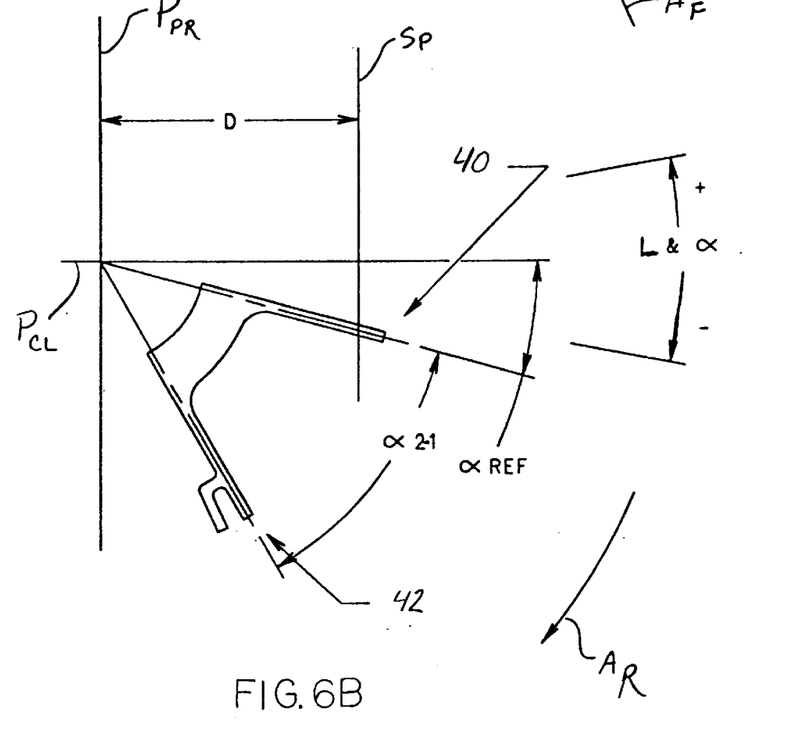

FIGS. 4A–4C indicate the relationship between the times of the reference pulses and the multiple arm structure pulses, for each of full reverse, feather, and mid range blade angle modes associated with propeller system 12. Accordingly, in full reverse mode, between two reference pulses, a single pulse from primary arm 34 and single toothed end portion 40 will be detected by sensor 30, as shown in FIG. 6B wherein single toothed end portion 40 is in the sensor plane $S_p$. The single pulse has a time $t_1$ from the first occurrence of a reference pulse. In the feather mode, between two reference pulses, only the double toothed end portion 42 of secondary arm 36 will be detected by sensor 30, as shown in FIG. 6A with end portion 42 on sensor plane $S_p$, thereby generating a double pulse at time $t_2$ from the first reference pulse. Finally, at mid range mode or between two reference pulses, both the single and double toothed pulses of single toothed end portion 40 and double toothed end portion 42 will be detected. The single pulse occurs at a time $t_1$, after the first reference pulse and the double pulse occurring at a time $t_2$, after the first reference pulse, wherein time $t_2$ is greater than time $t_1$.

Referring to FIGS. 1–7, after generation of the pulses $P_1$, $P_2$, and $P_{ref}$ by sensor 30, as described above, blade angle is calculated as follows:

(1) Controller 32 will measure the intervals $t_1$, $t_2$, and $t_{ref}$ from pulses $P_1$, $P_2$, and $P_{ref}$ as shown in FIGS. 4A through 4C.

(2) If the ratio $(t_1/t_{ref}) \geq X$, where X is a predetermined value for the ratio, then the blade angle is in the normal operating range, i.e. from approximately −20° to 50° which includes the full reverse and mid range modes, and controller 32 will calculate blade angle $\alpha_{calc}$ based on time interval $t_1$.

If the ratio $(t_1/t_{ref}) < X$, or if pulse $P_1$ is not detected, then the blade angle is above the normal operating range, i.e. approximately greater than 50°, approaching feather mode, to 90°, in feather mode, and controller 32 will calculate blade angle $\alpha_{calc}$ based on time interval $t_2$.

(3) calculate blade angle $\alpha_{calc}$:

from $t_1$ as:

$$\alpha_{calc} = \alpha_{ref} + \tan^{-1}((R/D)\sin(\beta_{ref} - 60 t_1/t_{ref}))$$

from $t_2$ as:

$$\alpha_{calc} = \alpha_{ref} + \alpha_{2-1} + \tan^{-1}((R/D)\sin(\beta_{ref} - 60 t_2/t_{ref}))$$

where:

$\alpha_{ref}$=the angular spacing between the primary target 40 and the propeller axis of rotation $P_{CL}$, when the propeller is at 0° blade angle (see FIGS. 2 and 6).

$\alpha_{2-1}$=the angular spacing between the primary and secondary targets, 40 and 42 respectively, on arm structure 24 (see FIGS. 2 and 6).

$\beta_{ref}$=the angular spacing between reference poles 28 and the axis $B_{CL}$ of propeller blade 14 (see FIG. 3);

D=the distance between the plane of rotation $P_{PR}$ of the propeller blades 14, and sensor 30 (see FIG. 6); and R=the radius from the propeller axis of rotation $P_{CL}$ to sensor 30 (see FIG. 3).

Prior to performing calculations via controller 32 for determining the blade angle of the propellers, controller 32, i.e. FADEC (full authority digital electronic controller), calibrates the data feedback signal. Accordingly, when the engine is started, and the propeller, spinner bulkhead and hub are rotating along with the reference poles 28 and arm structure 24, relative sensor 30, with the propeller in the feather mode, controller 32 functions to compare the value of $\alpha_1$, a first $\alpha_{calc}$ value calculated by controller 32 and used for calibration purposes including determining the relationship represented by FIG. 7, with the nominal value of $\alpha_1$ (discussed below) for each propeller blade. When the propeller is unfeathered on the ground, controller 32 will command the propeller to operate momentarily on the secondary low pitch stop where it will compare the value of $\alpha_2$, a second value of $\alpha_{calc}$ calculated by controller 32 also used for calibration purposes including determining the relationship represented by FIG. 7, with the nominal value of $\alpha_2$ (discussed below).

Figure 7:
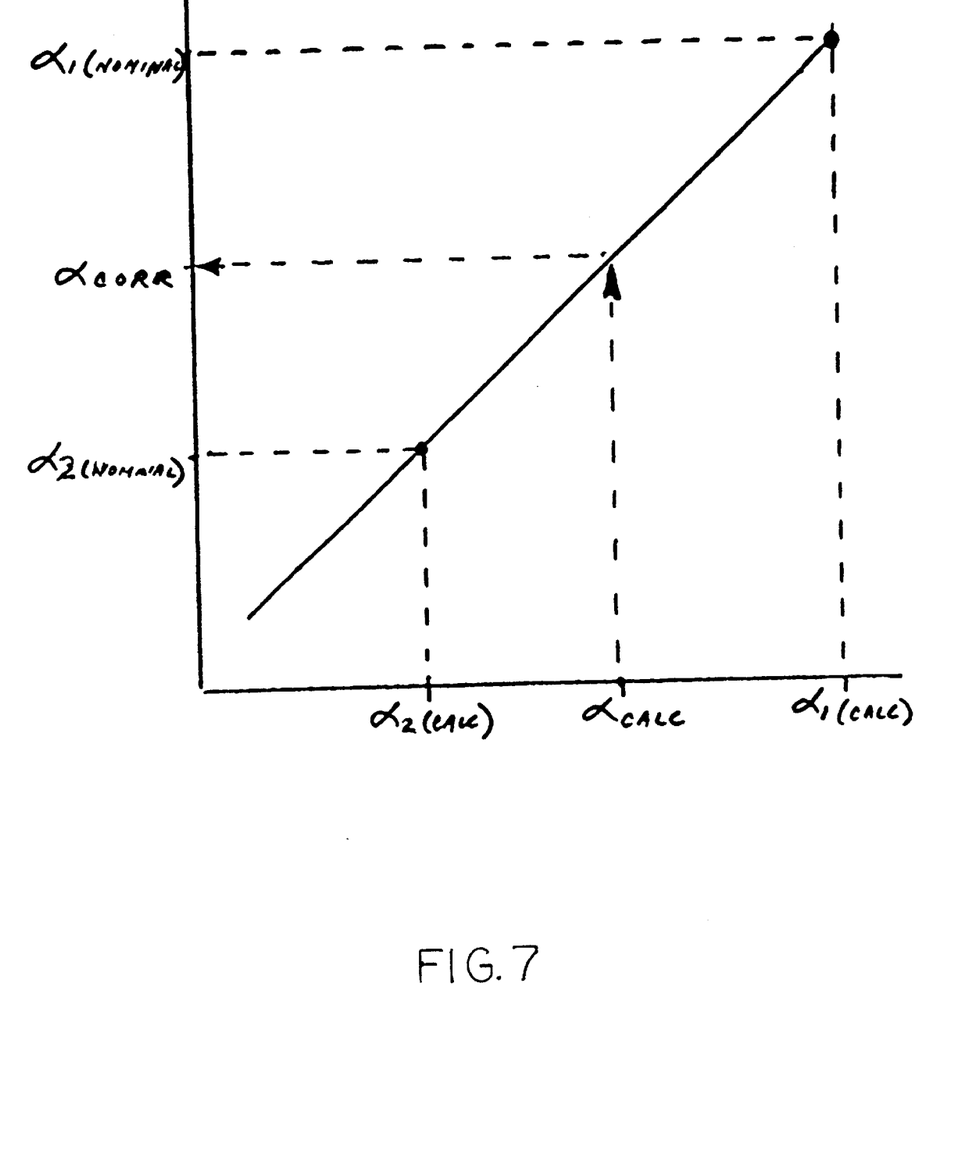
FIG. 7 is a graph indicative of a calibration plot of corrected blade angle $\alpha_{corr}$ versus $\alpha_{calc}$ used for calibrating the system and method of the present invention.

Accordingly, in the feather mode, the propeller blade angle $\alpha_1$ is determined by the location of a mechanical stop in the pitch change mechanism. At the secondary low pitch stop, the propeller blade angle $\alpha_2$ is established by the location of a retractable hydraulic or mechanical stop in the pitch change mechanism. The nominal values of $\alpha_1$ and $\alpha_2$ are determined during the design of the propeller. During assembly of the propeller, the locations of the feather stop and the secondary low pitch stop are adjusted to the nominal values of $\alpha_1$ and $\alpha_2$. Using these measurements, controller 32 will generate a calibration curve indicating the relationship between measured blade angle and actual blade angle, as shown in FIG. 7. During operation, after controller has calculated blade angle $\alpha_{calc}$, corrected blade angle $\alpha_{corr}$ is read from the calibration curve as shown in FIG. 7.

In order to average out the effects of hardware tolerances associated with each of the sensed propeller blades, an average blade angle $\alpha_{avg}$ is calculated as the arithmetic mean of the corrected blade angle $\alpha_{corr}$ of the sensed propeller blades. This is accomplished through the use of a rolling average. Controller 32 stores the values sensed during the last propeller revolution (i.e. last six values if six blades are instrumented) of $\alpha_{corr}$ in memory, and uses these values to calculate $\alpha_{avg}$. Each time a new value of $\alpha_{corr}$ is determined, this value is stored in memory and the oldest value of $\alpha_{corr}$ is deleted from memory. In this manner, controller 32 will update the value of $\alpha_{avg}$ each time a sensed propeller blade passes sensor 30.

The primary advantage of this invention is that an improved direct blade angle measurement system is provided for use with current propeller systems. Another advantage of this invention is that a direct blade angle measurement system is provided which includes the use of a plurality of arms connected to one or more blades, which arms are sensed by a sensor, and a plurality of reference poles also sensed by the sensor, wherein a control system is provided for determining blade angle via the sensed information. And still another advantage of this invention is that a direct blade angle measurement system is provided, which system allows for direct blade angle measurement via components extending directly from one or more propeller blades, wherein each component is sufficiently sized so as to avoid system damage.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A blade angle feedback system for use with a propulsion system having a plurality of angularly adjustable blades, wherein each of said blades has an axis of rotation and is rotatable about said axis of rotation through a plurality of blade angles, comprising:

means for indicating blade angle position of each of said blades, said means for indicating movable through said plurality of blade angles with said blades, wherein said means for indicating have a plurality of identities depending on and indicative of said blade angles;

means for designating a plurality of reference positions on said propulsion system and relative said means for indicating;

means for sensing passing and identity of said means for indicating and passing of said means for designating;

said propulsion system, said means for indicating, said means for designating, and said means for sensing having a geometric relationship defined by geometric parameters; and means for determining time between the passing of said means for indicating and said means for designating and for determining said blade angle position from said time, said identity and a plurality of said geometric parameters.

2. The system according to claim 1, wherein said blades include a rotatable base, and said means for indicating comprises at least one sensed portion attached to and rotatable with said blade and base, wherein said means for sensing is positioned to sense the passing and identity of said at least one sensed portion.

3. The system according to claim 2, wherein said means for indicating comprises a primary and a secondary arm attached to and rotatable with said blade and base.

4. The system according to claim 3, wherein said primary arm includes means for generating a single signal for sensing by said means for sensing and said secondary arm includes means for generating a multiple signal for sensing by said means for sensing.

5. The system according to claim 4, wherein said means for sensing comprises a pulse-pick-up sensor and said means for generating a single signal comprises said primary arm having a single tooth for pick-up by said sensor and said means for generating a double signal comprises said secondary arm having multiple teeth for pick-up by said sensor.

6. The system according to claim 4, further including a spinner bulkhead, wherein said primary and secondary arms are adapted to extend through said spinner bulkhead.

7. The system according to claim 6, wherein said means for sensing is non-rotatably affixed adjacent said primary and secondary arms.

8. The system according to claim 3, wherein said primary and secondary arms are angularly spaced apart such that during any blade angle at least one of said primary and secondary arms is detectable by said means for sensing.

9. The system according to claim 3, wherein said blades of said propulsion system are adapted to be adjusted such that said blade angles cause said propulsion system to run in a feather, reverse and mid-range mode, and wherein said primary and secondary arms are positioned and rotated with said blades such that during said feather mode only said secondary arm is sensed via said means for sensing, during said reverse mode only said primary arm is sensed via said means for sensing, and during said mid-range both said primary and secondary arms are sensed by said means for sensing.

10. The system according to claim 9, wherein said primary arm includes means for generating a single signal for sensing by said means for sensing and said secondary arm includes means for generating a double signal for sensing by said means for sensing, wherein said single and double signals define said identities.

11. The system according to claim 10, wherein said means for sensing comprises a pulse-pick-up sensor and said means for generating a single signal comprises said primary arm having one tooth for pick-up by said sensor and said means for generating a double signal comprises said secondary arm having two teeth for pick-up by said sensor.

12. The system according to claim 11, wherein said primary arm is spaced from said secondary arm and said primary and secondary arms are sized and shaped such that during rotation of said blades through said plurality of blade angles, at least one of said arms is detectable via said means for sensing.

13. The system according to claim 11, wherein said primary and secondary arms are substantially straight and are adapted to extend outwardly from a base portion of said blades toward said pulse pick-up sensor.

14. The system according to claim 1, wherein said means for designating comprises a plurality of pulse targets for use by said means for sensing.

15. The system according to claim 14, wherein said propulsion system includes a hub and a spinner bulkhead, and wherein said plurality of pulse targets are adapted to be positioned on one of said hub and spinner bulkhead in substantially equal angular intervals.

16. The system according to claim 1, wherein said blades include blade angle adjustment mechanisms, and wherein said means for determining is further for communicating blade angle adjustment commands to said blade angle adjustment mechanisms to adjust said blade angles as required.

17. The system according to claim 14, wherein said means for determining comprises a system controller, wherein said system controller receives information regarding said identity and passing from said means for sensing and determines said time and said blade angle position.

18. The system according to claim 1, wherein said reference positions are marked by a plurality of equally angularly spaced poles positioned adjacent said propulsion system.

19. A method for determining blade angle of a plurality of angularly adjustable blades of a propulsion system, wherein each of said blades is rotatable along an axis of rotation through a plurality of blade angles, comprising:

directly indicating blade position of each of said blades via an indicator movable through said plurality of blade angles with said blades, wherein said indicator has a plurality of potential identities;

defining a plurality of constant rotary reference positions on said propulsion system;

sensing passing of said indicator and passing of said reference positions from a location fixed relative said indicator and reference positions;

establishing the identity of said indicator, wherein said identities are indicative of the blade angle;

measuring time between the passing of said indicator and said reference positions, wherein said propulsion system, said indicator, said reference positions and said location have a geometric relationship defined by geometric parameters; and determining the blade angle from said identities, said time and a plurality of said geometric parameters.

20. The method according to claim 19, wherein said step of directly indicating comprises the step of providing a plurality of pulses indicative of said identities.

21. The method according to claim 20, wherein said step of providing includes generating at least one of a single and a double signal for sensing during said step of sensing.

22. The method according to claim 21, wherein said blades of said propulsion system are adapted to be adjusted such that said blade angles cause said propulsion system to run in a feather, reverse and mid-range mode, and wherein during said step of sensing said feather mode only said double signal is sensed via said means for sensing, during said reverse mode only said single signal is sensed via said means for sensing, and during said mid-range mode both said single and double signals are sensed by said means for sensing.

23. The method according to claim 19, wherein said step of determining is performed by a controller, further including the step of calibrating said controller.

24. The method according to claim 23, wherein said step of calibrating includes the steps of:

directly measuring said blade angle at a plurality of positions of each of said blades and determining direct blade angle;

calculating calibration blade angles by performing said steps of directly indicating, defining, sensing, establishing, measuring time, and determining;

defining a relationship between said direct blade angle and said calibration blade angles; and adjusting said blade angle in accordance with said relationship.

* * * * *